United States Patent
Hellmann et al.

(10) Patent No.: US 7,925,414 B2
(45) Date of Patent: Apr. 12, 2011

(54) METHOD AND DEVICE FOR INFLUENCING THE LONGITUDINAL VELOCITY OF A MOTOR VEHICLE

(75) Inventors: Manfred Hellmann, Hardthof (DE); Bernhard Lucas, Besigheim (DE); Thilo Leineweber, Stuttgart (DE); Albrecht Irion, Stuttgart (DE); Carsten Schroeder, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 747 days.

(21) Appl. No.: 11/663,718

(22) PCT Filed: Jul. 20, 2005

(86) PCT No.: PCT/EP2005/053521
§ 371 (c)(1),
(2), (4) Date: Jan. 14, 2008

(87) PCT Pub. No.: WO2006/034895
PCT Pub. Date: Apr. 6, 2006

(65) Prior Publication Data
US 2008/0255746 A1 Oct. 16, 2008

(30) Foreign Application Priority Data

Sep. 30, 2004 (DE) .......... 10 2004 048 193
Oct. 26, 2004 (DE) .......... 10 2004 051 909

(51) Int. Cl.
*G08G 1/16* (2006.01)
(52) U.S. Cl. .......... 701/96; 701/93; 701/94; 701/301; 701/300; 180/170; 180/168; 180/169
(58) Field of Classification Search .......... 701/96, 701/93, 94, 301, 300; 180/305, 169, 170, 180/168
See application file for complete search history.

(56) References Cited

U.S. PATENT DOCUMENTS
5,400,864 A * 3/1995 Winner et al. .......... 180/169
(Continued)

FOREIGN PATENT DOCUMENTS
DE 2555429 6/1977
(Continued)

OTHER PUBLICATIONS

Adaptive Fahrgeschwindigkeitsregelung ACC, Robert Bosch GmbH, Apr. 2002. (Described in Specification, see paragraph starting on p. 1, line 18).

*Primary Examiner* — Thomas G Black
*Assistant Examiner* — Marthe Marc Coleman
(74) *Attorney, Agent, or Firm* — Kenyon & Kenyon LLP

(57) ABSTRACT

A method and device for influencing the longitudinal velocity of a motor vehicle, in which a setpoint minimum distance and/or a setpoint maximum velocity is presettable by the driver, the driver being able to influence the vehicle velocity via the accelerator pedal and/or brake pedal, and in which the distance from a vehicle traveling ahead is measured by a distance-measuring sensor and, if the setpoint minimum distance is undershot and/or the setpoint maximum velocity is exceeded by the vehicle velocity, the vehicle velocity is limited so that the setpoint minimum distance is not undershot and/or the setpoint maximum velocity is not exceeded. This function is provided, in particular, in connection with an adaptive distance and cruise control system, the driver being able to activate either the adaptive distance and cruise control system or the limiting function.

12 Claims, 2 Drawing Sheets

U.S. PATENT DOCUMENTS

| | | | |
|---|---|---|---|
| 5,695,020 A | 12/1997 | Nishimura | |
| 2003/0070859 A1* | 4/2003 | Dahl et al. | 180/305 |
| 2004/0168843 A1* | 9/2004 | Lankes et al. | 180/178 |
| 2004/0172185 A1* | 9/2004 | Yamamura et al. | 701/96 |

FOREIGN PATENT DOCUMENTS

| | | |
|---|---|---|
| DE | 4241805 | 6/1994 |
| DE | 19714726 | 11/1997 |
| DE | 19638511 | 3/1998 |
| DE | 19802706 | 7/1999 |
| DE | 19942290 | 4/2001 |
| DE | 10030258 | 1/2002 |
| DE | 10047048 | 4/2002 |
| DE | 10238484 | 3/2004 |
| EP | 0897824 | 2/1999 |
| EP | 1304251 | 4/2003 |
| GB | 2298937 | 9/1996 |
| JP | 7137561 | 5/1995 |
| JP | 11222049 | 8/1999 |
| JP | 2003-048451 | 2/2003 |
| JP | 2003-205760 | 7/2003 |

* cited by examiner

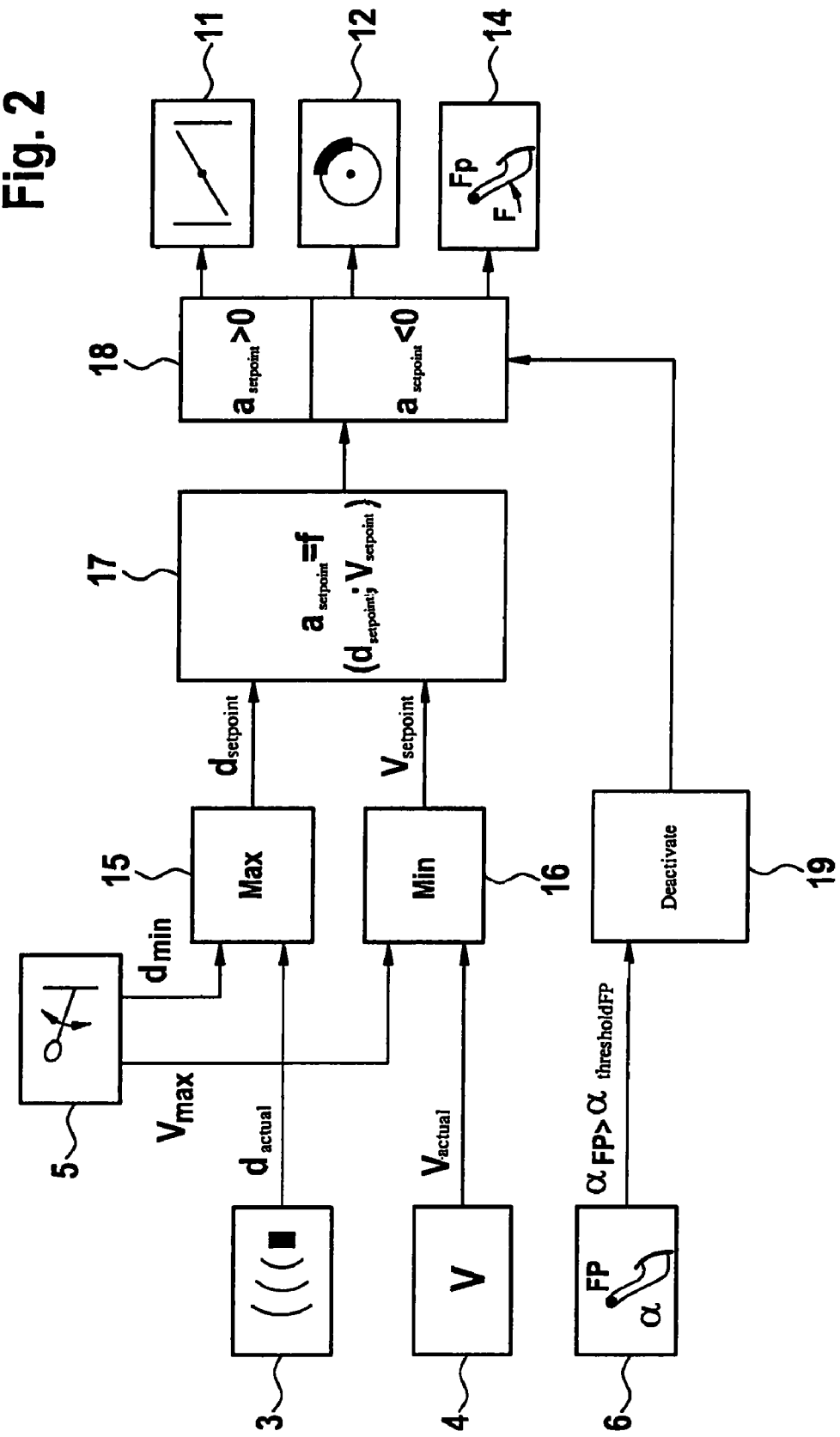

METHOD AND DEVICE FOR INFLUENCING THE LONGITUDINAL VELOCITY OF A MOTOR VEHICLE

FIELD OF THE INVENTION

The present invention relates to a method and a device for influencing the longitudinal velocity of a motor vehicle, in which a setpoint minimum distance and/or a setpoint maximum velocity is presettable by the driver, the driver being able to influence the vehicle velocity via the accelerator pedal and/or brake pedal, and in which the distance from a vehicle traveling ahead is measured by a distance-measuring sensor and, if the setpoint minimum distance is undershot and/or the setpoint maximum velocity is exceeded by the vehicle velocity, the vehicle velocity is limited so that the setpoint minimum distance is not undershot and/or the setpoint maximum velocity is not exceeded. This function is provided, in particular, in connection with an adaptive distance and cruise control system, the driver being able to activate either the adaptive distance and cruise control system or the limiting function.

BACKGROUND INFORMATION

A radar sensor which ascertains the distance and relative speed of vehicles traveling ahead and regulates the velocity of one's own vehicle is known from "Adaptive Cruise Control (ACC)," published by Robert Bosch GmbH in Apr. 2002 (ISBN-3-7782-2034-9). If a vehicle traveling ahead is detected, the vehicle velocity is controlled in the manner of a constant-distance regulating function so that one's own vehicle follows the vehicle traveling ahead at a predetermined distance. If no vehicle is detected ahead, the velocity is regulated in the manner of a constant-velocity regulating function, the vehicle velocity being adjusted to a setpoint velocity preset by the driver.

SUMMARY OF THE INVENTION

The object of the present invention is to provide a method and a device for limiting the vehicle operating variables with respect to certain parameters and for protecting the driver from exceeding these vehicle limits. For this purpose, it is possible to achieve a safe operating mode because, when the limiting function is activated, the vehicle may be operated only within the set limits with respect to a minimum distance or a maximum velocity.

An active accelerator pedal is also advantageously provided which generates a pedal return force if the driver operates the accelerator pedal to accelerate the vehicle when the distance from a vehicle traveling ahead reaches the setpoint minimum distance and/or when the vehicle velocity reaches the setpoint maximum velocity.

Furthermore, it is advantageous that the distance-measuring sensor be a radar sensor or a laser sensor which scans the area in front of the vehicle and ascertains at least the distance from detected objects as well as, if applicable, the relative velocity of the detected objects.

The limiting of the vehicle velocity advantageously increases gradually when the present distance between one's own vehicle and the detected object approaches the setpoint minimum distance and/or the vehicle velocity approaches the setpoint maximum velocity. In this case, the gradual increase in the vehicle limiting means that the acceleration request output by the system is reduced more rapidly the closer the vehicle velocity gets to the setpoint maximum velocity, a setpoint acceleration of 0 being output when the vehicle velocity is equal to the setpoint maximum velocity. This prevents the vehicle from traveling faster than specified by the setpoint velocity preset by the driver, and the limiting function gently prevents any further acceleration.

Furthermore, it is advantageous that the limiting function be deactivated when the accelerator pedal is deflected beyond a predetermined deflection angle. This enables the driver to override the function and accelerate the vehicle, for example in a critical situation, faster than would be allowed by the assistance system, thereby giving the driver a higher priority than the assistance function at all times.

Furthermore, it is advantageous that the predetermined deflection angle be dimensioned in such a way that the accelerator pedal is almost fully deflected. According to this embodiment, the limiting function is deactivated when the driver presses the accelerator pedal almost all the way in a manner similar to the kick-down function of an automatic transmission, enabling the system to distinguish between a rapid acceleration request having a deactivation function and the conventional cruise control function within the preset operating limits.

Furthermore, it is advantageous that the limiting function remains active when the brake pedal is operated. In assistance systems, the assistance functions are usually deactivated when the driver operates the brake pedal to ensure that the driver's commands have top priority in every situation. Because a vehicle deceleration following the operation of the brake pedal by the driver increases the distance from the vehicle traveling ahead after reaching the setpoint minimum distance or reduces the velocity after reaching the setpoint maximum velocity, operation of the brake pedal by the driver increases the safety reserves with regard to distance and velocity, so that deactivating the system is neither necessary, nor does it noticeably improve comfort.

Furthermore, it is advantageous that, as an alternative to the limiting function, an adaptive distance and cruise control system be activatable which, if an object is detected ahead, automatically regulates the vehicle velocity in the manner of a constant-distance regulating system and, if no object is detected ahead, automatically regulates the vehicle velocity in the manner of a constant-velocity regulating system.

A pedal return force is advantageously applied to the accelerator pedal if the driver operates the accelerator pedal to accelerate the vehicle when the distance from a vehicle traveling ahead reaches the setpoint minimum distance and/or when the vehicle velocity reaches the setpoint maximum velocity.

Furthermore, it is advantageous that the limiting of the vehicle velocity increases gradually when the present distance between one's own vehicle and the detected object approaches the setpoint minimum distance and/or the vehicle velocity approaches the setpoint maximum velocity.

When the accelerator pedal is deflected beyond a predetermined deflection angle, the limiting function is advantageously deactivated, in particular when the accelerator pedal is almost completely deflected.

The limiting function advantageously remains activated when the brake pedal is operated.

Implementing the method according to the present invention in the form of a control element which is provided for a control unit of an adaptive distance and cruise control system of a motor vehicle is of particular significance. In this context, a program is stored on the control element which is executable on an arithmetic unit, in particular on a microprocessor or signal processor, and is suitable for carrying out the method according to the present invention. In this case, therefore, the present invention is implemented by a program stored on the control element so that this control element provided with the program represents the present invention in the same manner as the method which the program is suitable to carry out. In particular, an electrical memory medium, for example a read-only memory, may be used as the control element.

Further features, possible applications, and advantages of the present invention are derived from the description of exemplary embodiments of the present invention that follows. All features described or illustrated by themselves or in any desired combination represent the object of the present invention, regardless of their combination in the patent claims or their back-references, and regardless of their wording in the description or illustration in the drawing.

BRIEF DESCRIPTION OF THE DRAWINGS

FIG. 2 shows a further diagram for the purpose of illustrating the present invention.

DETAILED DESCRIPTION

Figure 1:
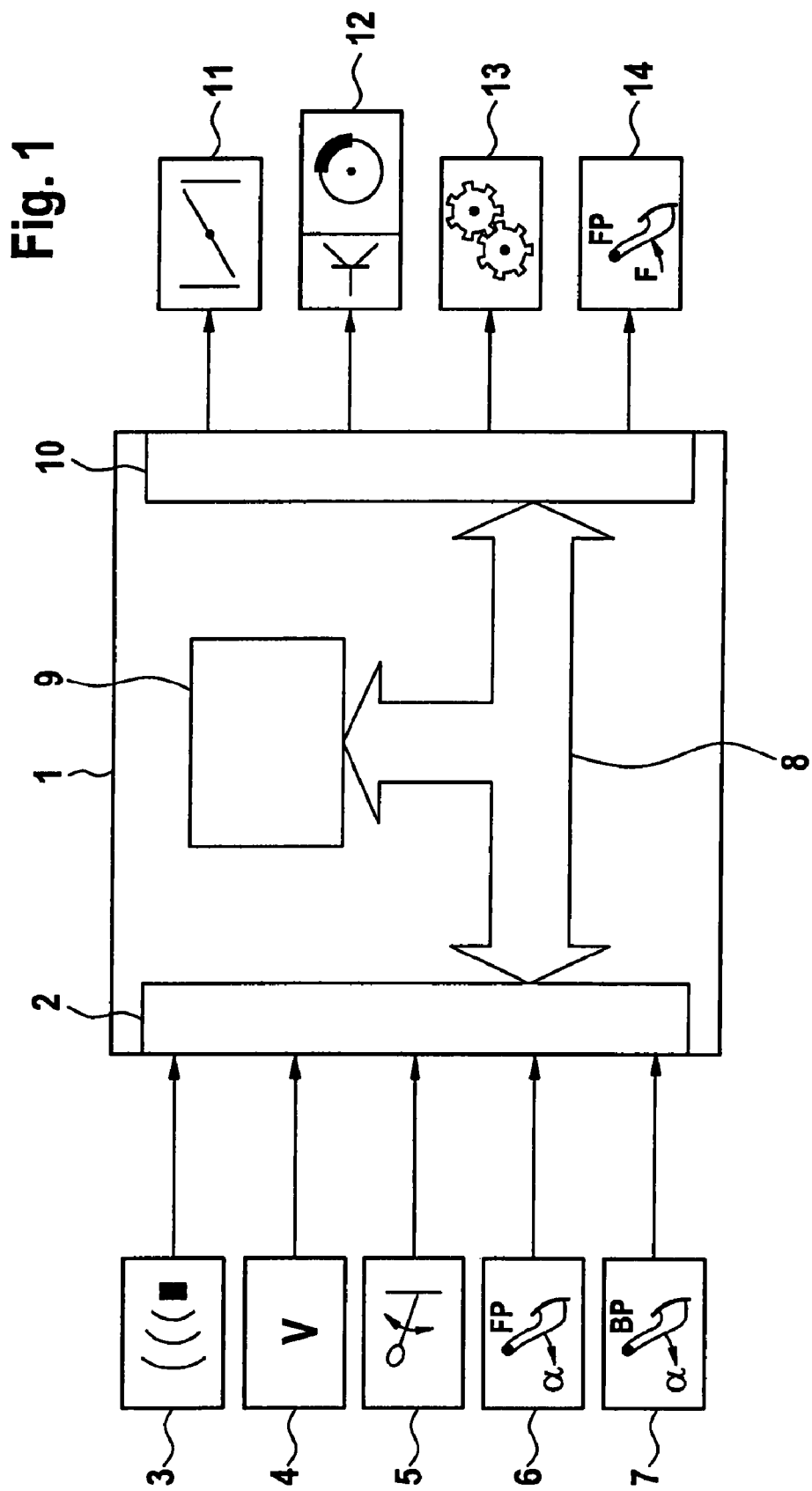
FIG. 1 shows a schematic block diagram of an embodiment of the device according to the present invention.

FIG. 1 shows a distance and cruise control system 1 which has an input circuit 2. Input signals may be supplied to distance and cruise control system 1 via input circuit 2 for further processing. Data of an object sensor system 3, which scans the area in front of the vehicle and ascertains at least the distance from these detected objects and supplies it to distance and cruise control system 1, is supplied as input signals. In the event that distance and cruise control system 1 has an additional functionality which may be used to automatically accelerate and brake the vehicle without the driver having to operate the accelerator pedal or the brake pedal for this purpose, it is further advantageous that object sensor 3 ascertains, in addition to the distance between one's own vehicle and the detected objects, the relative velocity of these objects with regard to one's own vehicle, and to supply it to input circuit 2. In this case, object sensor system 3 may be designed, for example, as a microwave sensor or a laser sensor which emits electromagnetic radiation and receives and evaluates reflection rays reflected on the objects. In addition, a velocity sensor 4 ascertains an input signal which represents the velocity of one's own vehicle and supplies it to input circuit 2. By ascertaining host vehicle's velocity $v_{actual}$, it is possible to convert the relative values ascertained via object sensor system 3 to absolute values and to implement a velocity limiting function as a function of one's own vehicle's velocity. The signals of a driver-operated control apparatus 5, which the driver may use to activate and deactivate the distance and cruise control system or operate driver-specific control devices, are also provided as input signals. Via this control apparatus 5, the driver may either activate only the function for maintaining a minimum distance from the vehicle traveling ahead, or operate only the function for preventing the vehicle from exceeding a preset maximum velocity, or activate both of these functions simultaneously. Signals which represent the deflection angle of accelerator pedal FP and brake pedal BP are also supplied to input circuit 2. The deflection angle of accelerator pedal αFP, which is provided by an angle sensor of accelerator pedal 6, provides distance and cruise control system 1 with the angle by which the driver has deflected accelerator pedal FP. An angle sensor of brake pedal 7 is also provided for providing distance and cruise control system 1 with angle αBP by which the driver has deflected the brake pedal. The input signals supplied to input circuit 2 are forwarded via a data exchange system 8 to a calculation apparatus 9 in which actuating signals are ascertained for downstream equipment as a function of the input signals. The actuating signals ascertained by calculation apparatus 9 for the downstream actuating equipment are forwarded via data exchange system 8 to an output circuit 10 to which the downstream actuating equipment is connected. Thus, a performance-determining actuating element 11 of an internal combustion engine may be driven via output circuit 10, this element being designable, for example, as an electrically drivable throttle valve or as a fuel volume metering unit of a fuel injection system. This actuating element may be used to convert acceleration requests ascertained by calculation means 9 to a vehicle acceleration. Deceleration equipment 12 of the vehicle is provided as a further actuating element, output circuit 10 being able to output signals to an electrically controllable braking force regulating system which, in turn, converts the request signal to a corresponding braking pressure or a corresponding braking force, enabling the deceleration equipment of the vehicle in the form of, for example, wheel brakes to be controlled, and decelerate the vehicle accordingly in the presence of a vehicle deceleration request ascertained by calculation means 9. A transmission control apparatus 13 may also be provided which receives actuating signals from calculation apparatus 9, which represents, for example, the presently optimum transmission stage of an automatic transmission and sets the gear ratio accordingly. An active accelerator pedal 14, which may be supplied with a signal representing a return force $F_{FP}$, may also be provided as a downstream actuating element. This active accelerator pedal 14 converts the output signal of output circuit 10 to a return force $F_{FP}$ which presses the accelerator pedal against the driver's foot and lets the driver know that there is no point in continuing to step on the gas since, for example, the vehicle has already reached the setpoint maximum velocity, or the vehicle has reached the setpoint minimum distance from the vehicle traveling ahead.

FIG. 2 shows a block diagram which is able to run in calculation means 9, for example as a program. Object sensor 3 is used to ascertain at least the distance from the objects detected ahead and supply it as variable $d_{actual}$ to a maximum value selector 15. If the driver has activated the limiting function via control device 5, he may enter, via the control device, for example, a setpoint minimum distance $d_{min}$ which is also supplied to maximum value selector 15. Maximum value selector 15 ascertains, from the two variables $d_{actual}$ and $d_{min}$ supplied thereto, the presently higher value and supplies it as setpoint distance $d_{setpoint}$ to a calculation means for setpoint acceleration 17. In addition, velocity sensor 4 generates a signal $v_{actual}$ representing the present vehicle velocity, which is supplied to a minimum selection apparatus 16. If the driver would like to activate a maximum value limitation of the vehicle velocity, he may communicate this wish to the system via control element 5 and enter a setpoint maximum velocity value $v_{max}$. This setpoint maximum velocity value $v_{max}$ is also supplied to minimum selection apparatus 16, which selects the currently smaller value of the two input signals supplied to it and forwards them as setpoint velocity $v_{setpoint}$ to the calculation means for setpoint acceleration 17. According to the present invention, the driver may activate either a minimum distance limiting function, which prevents one's own vehicle from further approaching a vehicle traveling ahead, or the driver may activate a maximum velocity limiting function which prevents the velocity from exceeding the setpoint maximum velocity preset by the driver by limiting it, or the driver may activate both functions, i.e., the setpoint minimum distance limit as well as the setpoint maximum velocity limit. The calculation means for setpoint acceleration 17 ascertains, from the variables of setpoint distance $d_{setpoint}$ and setpoint velocity $v_{setpoint}$ supplied to it, as a function of a vehicle dynamic equation, an acceleration request $a_{setpoint} = f(d_{setpoint}; v_{setpoint})$, which may assume positive values if an increase in the vehicle velocity is desired and negative values if a vehicle deceleration is desired. Setpoint acceleration $a_{setpoint}$ is supplied to an actuating signal coordinator 18, which, in the case of positive values, i.e., a desired acceleration, supplies these values to the downstream actuating element in the form of a performance-determining actuating element 11 of the internal combustion engine and, in the case of negative setpoint accelerations, forwards the latter to deceleration equipment 12 of the vehicle and simultaneously generates a pedal return force $F_{FP}$ in an active accelerator pedal 14. If the driver operates accelerator pedal 6 while the limiting function is activated, a present pedal angle $\alpha_{FP}$ is ascertained and compared with a predetermined deflection angle $\alpha_{thresholdFP}$. If the accelerator pedal deflection exceeds this predetermined pedal angle threshold value, this information is supplied to a deactivation apparatus 19. Predetermined accelerator angle threshold value $\alpha_{thresholdFP}$ may be dimensioned in such a way that the accelerator pedal must be pressed down almost all the way in a manner similar to a kick-down function of a vehicle having an automatic transmission.

What is claimed is:

1. A device for influencing a longitudinal velocity of a motor vehicle, in which at least one of a setpoint minimum distance and a setpoint maximum velocity is presettable via a driver-operable control device, a driver being able to influence a vehicle velocity via at least one of an accelerator pedal and a brake pedal, the device comprising:
   a distance-measuring sensor for measuring a distance from a vehicle traveling ahead; and
   an arrangement for, if at least one of the setpoint minimum distance is undershot and the setpoint maximum velocity is exceeded by the vehicle velocity, limiting the vehicle velocity so that at least one of the setpoint minimum distance is not undershot and the setpoint maximum velocity is not exceeded;
   wherein the limiting of the vehicle velocity increases gradually when at least one of an instantaneous distance between the vehicle and a detected object approaches the setpoint minimum distance and the vehicle velocity approaches the setpoint maximum velocity.

2. The device as recited in claim 1, wherein:
   the accelerator pedal includes an active accelerator pedal for generating a pedal return force if the driver operates the active accelerator pedal to accelerate the vehicle at least one of when the distance from the vehicle traveling ahead reaches the setpoint minimum distance and the vehicle velocity reaches the setpoint maximum velocity.

3. The device as recited in claim 1, wherein:
   the distance-measuring sensor includes one of a radar sensor and a laser sensor that scans an area in front of the vehicle and ascertains at least a distance from a detected object and a relative velocity of the detected object.

4. The device as recited in claim 1, wherein a limiting function is deactivated when the accelerator pedal is deflected beyond a predetermined deflection angle.

5. The device as recited in claim 4, wherein the predetermined deflection angle is dimensioned in such a way that the accelerator pedal is almost fully deflected.

6. The device as recited in claim 4, wherein the limiting function remains activated when the brake pedal is operated.

7. The device as recited in claim 4, wherein:
   as an alternative to the limiting function, an adaptive distance and cruise control system is activatable which, when an object is detected ahead, automatically regulates the vehicle velocity in the manner of a constant-distance regulating system and, if no object is detected ahead, automatically regulates the vehicle velocity in the manner of a constant-velocity regulating system.

8. A method for influencing a longitudinal velocity of a motor vehicle, in which at least one of a setpoint minimum distance and a setpoint maximum velocity is presettable via a driver-operable control device, a driver being able to influence a vehicle velocity via at least one of an accelerator pedal and a brake pedal, the method comprising:
   measuring by a distance-measuring sensor a distance from a vehicle traveling ahead; and
   if at least one of the setpoint minimum distance is undershot and the setpoint maximum velocity is exceeded by the vehicle velocity, limiting the vehicle velocity so that at least one of the setpoint minimum distance is not undershot and the setpoint maximum velocity is not exceeded;
   wherein the limiting of the vehicle velocity increases gradually when at least one of an instantaneous distance between the vehicle and the detected object approaches the setpoint minimum distance and the vehicle velocity approaches the setpoint maximum velocity.

9. The method as recited in claim 8, further comprising:
   applying a pedal return force to the accelerator pedal if the driver operates the accelerator pedal to accelerate the vehicle at least one of when the distance from a vehicle traveling ahead reaches the setpoint minimum distance and when the vehicle velocity reaches the setpoint maximum velocity.

10. The method as recited in claim 8, further comprising:
    deactivating, when the accelerator pedal is almost completely deflected beyond a predetermined deflection angle, the limiting function.

11. The method as recited in claim 10, wherein the limiting function remains activated when the brake pedal is operated.

12. The method as recited in claim 8, wherein:
    as an alternative to the limiting function, an adaptive distance and cruise control system is activatable which, when an object is detected ahead, automatically regulates the vehicle velocity in the manner of a constant-distance regulating system and, if no object is detected ahead, automatically regulates the vehicle velocity in the manner of a constant-velocity regulating system.

* * * * *